E. G. BALCH.
AEROPLANE SIGNAL.
APPLICATION FILED JULY 23, 1918.
1,320,308.
Patented Oct. 28, 1919.
4 SHEETS—SHEET 1.
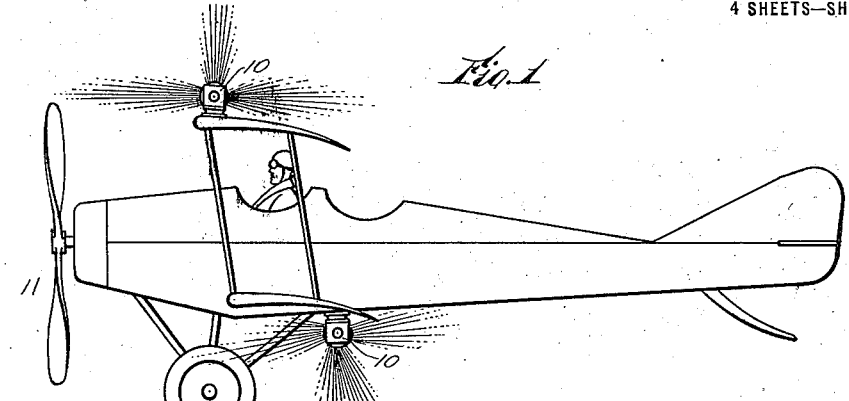
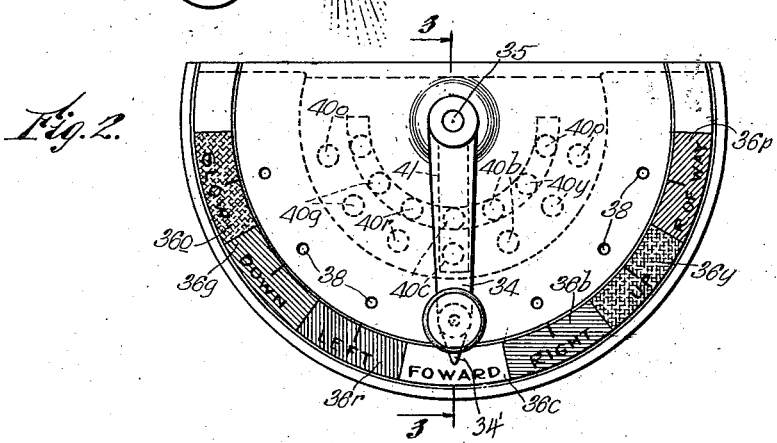
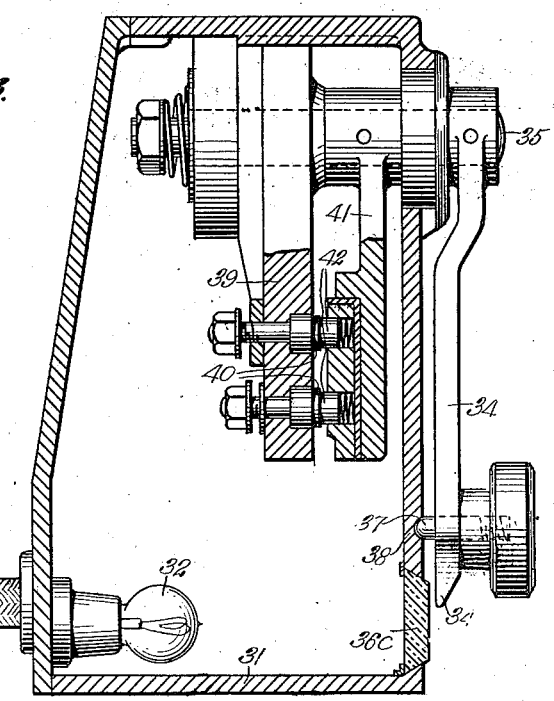
WITNESSES
INVENTOR
E. G. Balch
BY
ATTORNEYS

E. G. BALCH.
AEROPLANE SIGNAL.
APPLICATION FILED JULY 23, 1918.

1,320,308.

Patented Oct. 28, 1919.
4 SHEETS—SHEET 2.

WITNESSES
Frank J. Paggiani
Geo. H. Beeler

INVENTOR
E. G. Balch
BY
ATTORNEYS

E. G. BALCH.
AEROPLANE SIGNAL.
APPLICATION FILED JULY 23, 1918.
1,320,308.
Patented Oct. 28, 1919.
4 SHEETS—SHEET 3.
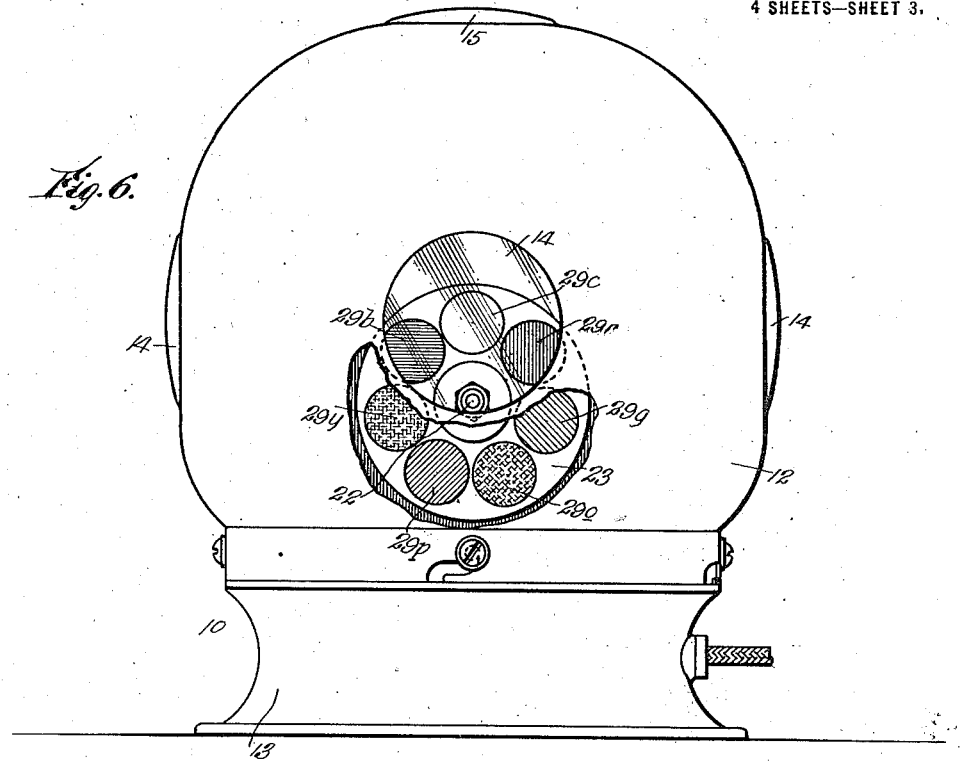
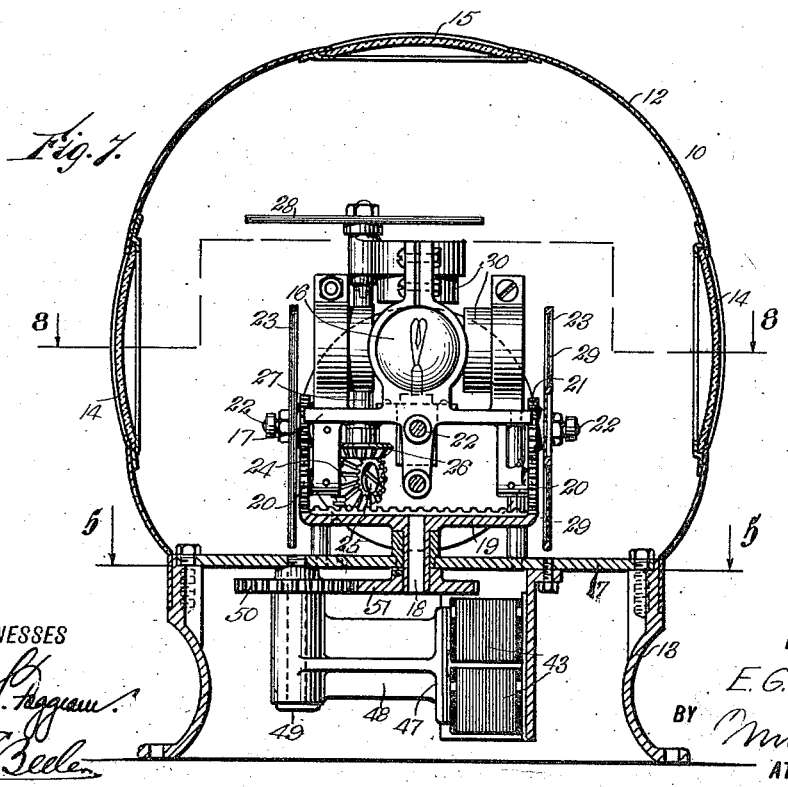
WITNESSES
INVENTOR
E. G. Balch
BY
ATTORNEYS E. G. BALCH.
AEROPLANE SIGNAL.
APPLICATION FILED JULY 23, 1918.
1,320,308.
Patented Oct. 28, 1919.
4 SHEETS—SHEET 4.
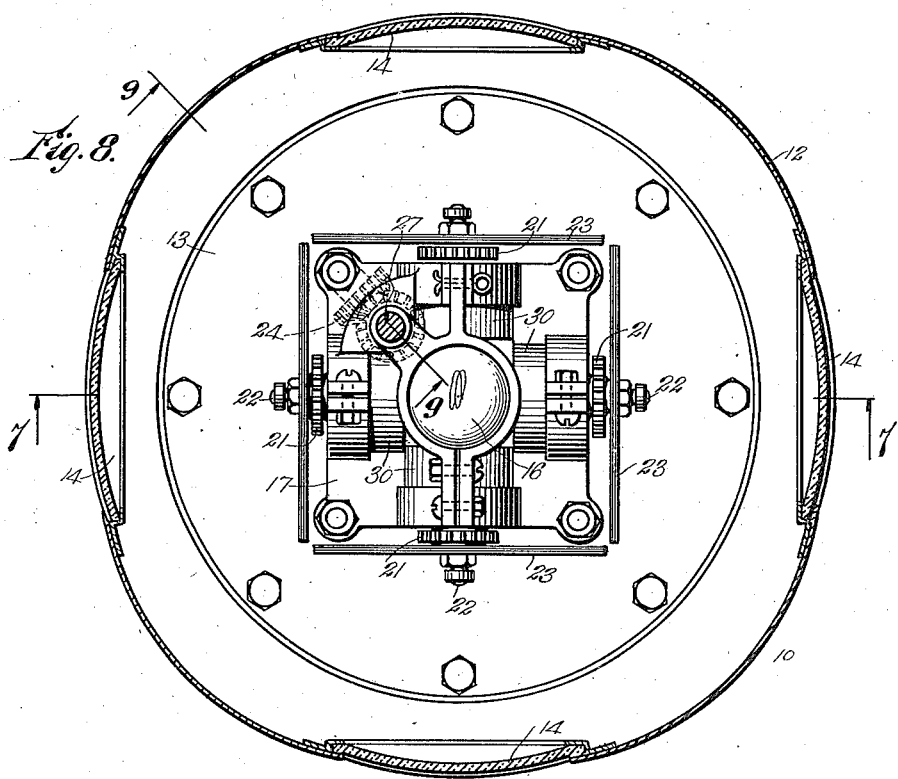
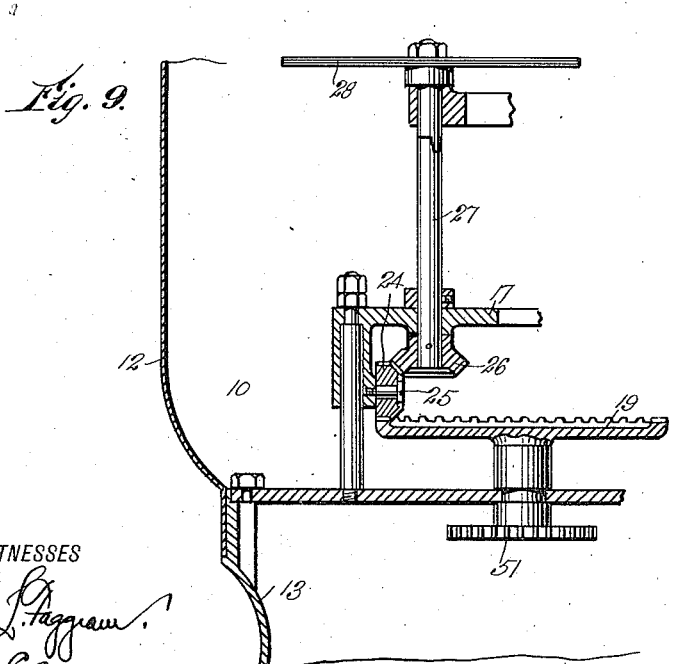
WITNESSES
INVENTOR
E. G. Balch
BY
ATTORNEYS

UNITED STATES PATENT OFFICE.

EBEN G. BALCH, OF NEWBURYPORT, MASSACHUSETTS.

AEROPLANE-SIGNAL.

1,320,308.

Specification of Letters Patent. Patented Oct. 28, 1919.

Application filed July 23, 1918. Serial No. 246,417.

*To all whom it may concern:*

Be it known that I, EBEN G. BALCH, a citizen of the United States, and a resident of Newburyport, in the county of Essex and State of Massachusetts, have invented a new and Improved Aeroplane-Signal, of which the following is a full, clear, and exact description.

This invention relates to signaling apparatus, and has particular reference to variable or changeable light or color signals to be transmitted through great distances and recognized by sight as distinguished from hearing or other senses.

Among the objects of the invention is to provide a signaling device or system for use on or in connection with rapidly moving vehicles, the system including one or more light units each of which is provided with a plurality of bull's eyes or windows so arranged that at lease one of them will be visible irrespective of the direction from the observer in which the vehicle may be located.

A further object of the invention is to equip a flying machine or aeroplane with one or more of the aforesaid light units preferably on the top and bottom, the plurality of units being arranged in multiple for simultaneous operation, means being provided to enable the driver or aviator to so manipulate the light mechanism as to effectively transmit the desired light signal, suitably codified if desired, so that other aviators or other observers may recognize the signals and thereby understand what the intention of the aviator or operator originating the signals is.

While I illustrate and refer herein to the application of my present improvement to aircraft it is to be distinctly understood that I do not intend to be limited unnecessarily in this respect to any particular field of usefulness for my improvement, reserving the right naturally to extend very large the activities of the system to the fullest possible extent so far as warranted by the prior art.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation or diagram illustrating a conventional form of aeroplane indicating the employment of two of my light units, one at the top and one at the bottom, and showing how that at least one beam of light from either of the light-units or lamps will be certain to be in range of any observer within the range of the power of the source of light irrespective of the direction of the observer from the machine.

Fig. 2 is a plan view of the controller or switch box.

Fig. 3 is a vertical sectional view on the line 3—3 of Fig. 2.

Fig. 6 is a side elevation of one of the lamp casings.

Fig. 7 is a vertical section on the line 7—7 of Fig. 8.

Fig. 8 is a horizontal section on the line 8—8 of Fig. 7; and

Fig. 9 is a vertical sectional detail on the line 9—9 of Fig. 8.

Figure 4:
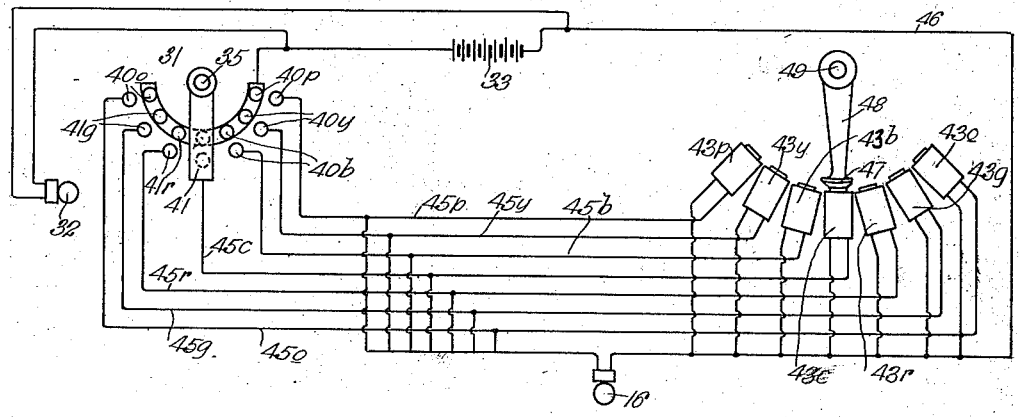
Fig. 4 is a diagram of the wiring and indicating the relation of the lamps to the controller and light projecting means.
Figure 5:
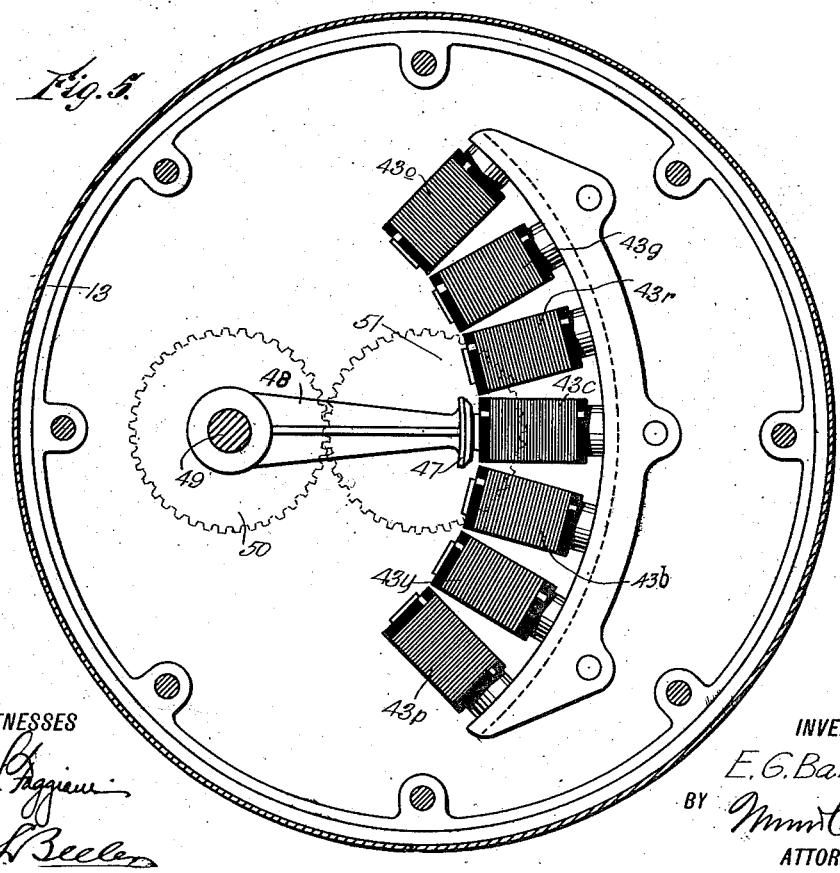
Fig. 5 is a horizontal sectional view on the line 5—5 of Fig. 7.

Specific reference will first be made to the sources of signal light or light units each represented as a whole at 10, and shown in the drawings as being arranged in multiple, two in number, one at the top and front portion of the aeroplane 11, and one at the bottom thereof. Each lamp unit in general comprises a lamp casing 12 secured in any suitable manner on a base 13, said casing being provided with four lateral bull's eyes or windows 14, the axes of which all lie in the same horizontal plane, and a fifth bull's eye or window 15 the axis of which is perpendicular to the plane of the other axes so that the axis of the window 15 with respect to the lamp unit on top of the vehicle will be upward while the corresponding axis of the lower unit will be downward. It is to be understood obviously that the light from the lateral windows 14 will project normally into horizontal directions from both lamp units, forward, rearward, and laterally when the system is in use. Arranged centrally within the casing 12 and approximately at the intersection of the axes of the several bull's eyes or windows is located an electric lamp 16 of suitable construction and power and preferably of low voltage. As suggested for this purpose the employment of a twenty-four candle power nitrogen filled tungsten lamp is preferable.

Making further reference to the mechanical construction of the light projecting apparatus, 17 indicates a frame supported upon or in connection with the base 13, said frame being suitably designed to constitute supports for the fixed parts and bearings for the several movable parts of said projecting apparatus. 18 indicates a shaft journaled in the lower portion of the frame 17, and with its axis normally vertical and central of the lamp casing. On the upper or inner end of the shaft 18 is fixed a crown gear 19 with which mesh continually a series of pinions 20 journaled in the frame and having their axes intersecting in the vertical axis of the shaft 18. Each of these pinions meshes with a corresponding gear 21 fixed to a horizontal shaft 22 to which is fixed a rotary shutter 23. The axes of the shafts 22 lie in the same horizontal plane below the plane of the axes of the windows 14, hence each of the shutters rotates in a vertical plane. This description will be understood as being applicable to the light casing arranged on the top of the vehicle in normal advancing position, and with respect to the light casing at the bottom of the vehicle the description will be applied as inverted.

With reference now to Figs. 8 and 9 it will be noted that the crown gear 19 meshes with a fifth pinion 24 journaled on a fixed axis 25 at one corner of the frame 17. This pinion 24 includes also a miter gear meshing with a corresponding miter gear 26 fixed upon the lower end of a vertical shaft 27 to which at the upper end is fixed a rotary shutter 28 operating in a horizontal plane.

Except as to location the shutters 23 and 28 will be understood to be identical in construction, operation, and function. Fig. 6 indicates each of these shutters being in the form of a disk and provided with a series of distinguishing color disks or wafers constituting inserts in a like number of circular openings formed in the disk between its axis and its periphery. Said wafers are indicated as seven in number and equally spaced circumferentially and radially and of different distinguishing colors. As shown in Fig. 6, for example, I provide seven of these wafers indicated at $29^o$, $29^g$, $29^r$, $29^c$, $29^b$, $29^y$ and $29^p$, the literal exponents representing the colors orange, green, red, clear, blue, yellow, and purple respectively. Obviously any other colors may be employed and in greater or less number according to the requirements in any particular use or construction covering my improvement.

The axis of the vertical shaft 27 is spaced laterally from the vertical axis of the window 15 to correspond with the distance of the plane of the axes of the shafts 22 below the plane of the axes of the windows 14. This distance with respect to all of the shutters is so designed as to bring the wafers during the rotation of the shutters successively directly between the lamp 16 and the respective windows 14 and 15, it being understood that the wafers of all of the shutters are so adjusted or timed as to display like colors simultaneously through all of the windows.

Directly between the lamp 16 and each of the active wafers is located any suitable type or construction of light condenser 30 similar to an ordinary stereopticon by which the effect of the light from the lamp is greatly intensified.

Any suitable means may be provided to operate the light projecting apparatus so that the operator or aviator may transmit suitable signals. To this end I suggest the mechanism as shown best in Figs. 2, 3, and 4, wherein is shown a controller box 31 of segmental form for convenience and provided on its interior with a small low voltage electric lamp 32 in circuit constantly with a battery 33 or other suitable source of energy. 34 indicates a controller or switch handle connected to a shaft 35 journaled in the controller box, the free end of the switch handle being movable in an arc of a circle over the face of said box, the point 34' of the handle sweeping successively over distinguishing color inserts $36^o$, $36^g$, $36^r$, $36^c$, $36^b$, $36^y$, and $36^p$, which will be understood to correspond in character number, and location to the wafers 29 above described. As indicated in Fig. 2 these inserts are preferably provided with legends directly thereon so that the meaning of the different colors will always be apparent to the operator even though of limited experience, and whereby furthermore a distant observer of similar signals may by a glance at his controller box similarly equipped, be advised infallibly as to the intention of the distant operator. The handle 34 is provided preferably with some suitable spring actuated catch 37 adapted to snap successively into a series of sockets 38 formed in the face of the controller box so that the handle will always be held at any desired adjustment.

Within the box 31 is located an arc-shaped contact carrier 39 made preferably of insulation and carrying a pair of contacts 40 for each color signal. Attached to the axle 35 of the switch handle is a switch arm 41 carrying a pair of spring actuated contacts 42 always in electrical communication with each other and constituting a bridge between the normally spaced contacts 40 of the several pairs of contacts on the bar 39. In each light casing are arranged a series of selective electromagnets 43, shown as seven in number, and identified herein with the distinguishing characters 43°, 43ᵍ, 43ʳ, 43ᶜ, 43ᵇ, 43ʸ, and 43ᵖ, corresponding in number, character, and order to the other distinguishing color features. These magnets 43 are adapted to be brought successively into circuit with the battery 33 or any other suitable source of energy, the means shown comprising a conductor 44 leading from one side of the battery to the several pairs of fixed contacts 40, thence through the selective conductors 45°, 45ᵍ, 45ʳ, 45ᶜ, 45ᵇ, 45ʸ, and 45ᵖ, through the corresponding pairs of magnets and thence through a trunk conductor 46 back to the battery. The magnets 43 act successively upon an armature 47 fixed to the end of an arm 48 journaled upon a stud 49 and to which arm is attached a master gear 50 having constant mesh with the corresponding gear 51 fixed to the lower end of the shaft 18 of the crown gear in each light casing. It will be understood that the length of the arm 48 and arc through which it operates the several gears operated therefrom are so designed as to cause rotation of the several shutters in accordance with the circumferential spacings between the color wafers carried by the shutters.

The position of the switch handle and other parts, the location of which is determined thereby, as shown in the drawings, is at the clear indication or to indicate the forward movement of the vehicle. Under these conditions the armature 47 as well as the switch handle is in its mid position and all of the wafers 29ᶜ are effective or are located between the lamp 16 and all of the windows or bull's eyes of as many light units as may be employed. The lamp 16 consequently is glowing and clear light is being projected. Between each pair of contacts 40 and the next is a dead spot and so if desired the switch handle may be moved to any dead spot with the result that the lamp 16 is cut out and the magnets are all dead. The operator then desiring to project any color or light indicated and named on his chart or control box will grasp the handle 34 and swing it around its axis 35 so as to point directly to the center of the corresponding color insert 36. During this movement, two conditions obtain: First, since the first pair of contacts 40 are bridged during this movement of the switch handle the circuit pertaining thereto will be completed and a flash of distinct color will be projected from the light casings. If the handle is being moved through a considerable distance there will correspondingly be a succession of different colored flashes which will have the effect of calling attention of the observer to the fact that the operator is changing his light indication. The second result of this step by step actuation of the handle will be to successively energize the intermediate magnets 43 whereby the armature 47 will be actuated from one magnet to the next making the magnets effective to swing the arm 48 irrespective of the distance from the starting point to the intended position of the switch handle.

The signaling apparatus herein described and illustrated is of relatively simple construction, easy to understand and manipulate, and is exceedingly effective in practice. The skill or effort on the part of the operator is limited by the movement of the handle 34 over the arc arrangement of color inserts and his ability to read the legends thereon. In the movement of the handle 34 from one position to another the operator can always appreciate the snapping of the catch 37 into a socket 38 and thereby will know that he is either giving a signaling indication or that his apparatus is at an intermediate dead point. While the small lamp 32 is indicated herein as being in constant circuit so that all of the color inserts are constantly illuminated, it is obvious that said lamp might be arranged similarly in the several circuits 45 with the lamp 16 so as to illuminate only one of said inserts and thus give the operator positive knowledge by the appearance of the selected insert as to the condition of his light projectors.

I claim:

1. In signal mechanism, a casing having a plurality of windows, all of said windows except one having their axes lying in the same plane while the axis of the remaining window is perpendicular to said plane, a source of light at the intersection of said axes, a series of movable shutters located between the source of light and the respective windows, each of said shutters comprising a plurality of distinctive color wafers, the wafers of the several shutters being arranged in the same manner, and means to move the several shutters simultaneously so as to bring like colored wafers between the source of light and all of the windows.

2. In signal mechanism, the combination of a casing having a plurality of lateral windows having intersecting axes, and another window whose axis is perpendicular to and intersects the axes of the other windows, a source of light at the point of intersection of all of the axes of the windows, a series of rotary shutters having correspondingly arranged selective color wafers adapted to be brought in succession between the source of light and the respective windows, and means to rotate all of said shutters simultaneously so as to bring similarly colored wafers of all of them simultaneously into the axes of the several windows whereby similar light rays will be projected from the casing through all of the windows.

3. In signal mechanism, the combination of a casing having a plurality of windows, a source of light within the casing in the axes of the windows, means located between the source of light and the windows to intensify the effect of the light, movable shutters each having a series of light transmitting wafers of different colors between the source of light and the respective windows, the wafers of the several shutters being similarly arranged and of like color each to each, and means to move all of the shutters simultaneously in the same general direction and to the same extent so as to bring similarly colored wafers of the several shutters into position between the source of light and the several windows.

4. In signal mechanism, the combination of a casing having a plurality of windows having intersecting axes, a source of light within the casing at the point of intersection of the axes, a shutter in the form of a rotary disk located between the source of light and each window and lying in a plane perpendicular to the axis of such window, the axis of the shutter being spaced from the axis of its window, the several shutters having similarly arranged distinctive color wafers arranged circumferentially between the centers and the peripheries of the shutters, and actuating means serving to rotate all of the shutters simultaneously and so bring and hold wafers of like color in all of the shutters in the window axes aforesaid.

5. In signal mechanism, the combination of a casing, a rigid base supporting the casing, a frame fixed to the base, a series of shutters journaled for rotation around fixed bearings in the frame, each shutter carrying a series of distinctive color wafers, a crown gear journaled in the base, means to rotate the gear through different lengths of arcs, connections between the crown gear and the several shutters serving to cause the shutters to be rotated in similar directions and to the same extents so as to bring like colored wafers into action, and means to transmit light through all of the wafers so located.

6. In visible signal mechanism, the combination of a casing having a plurality of windows with intersecting axes, an electric lamp located at the point of intersection of said axes, a movable shutter between the lamp and each window, each shutter having a series of distinctive color wafers, the wafers of the several shutters being of like character, each to each, and similarly arranged in the several series, the lamp being located in normally open circuit with a source of energy, a series of selective means to close said circuit to light the lamp, and power means of a selective nature simultaneously actuated on the closing of said circuit to cause movement of all of the shutters so as to cause the light from the lamp to be yielded simultaneously through wafers of like color in all of the shutters.

EBEN G. BALCH.